Feb. 23, 1954  J. COLPO  2,670,220
TRACTOR TRAILER CONNECTION DEVICE
Filed Oct. 10, 1951  2 Sheets-Sheet 1

INVENTOR.
Jesse Colpo
BY
Bean, Brooks, Buckley & Bean

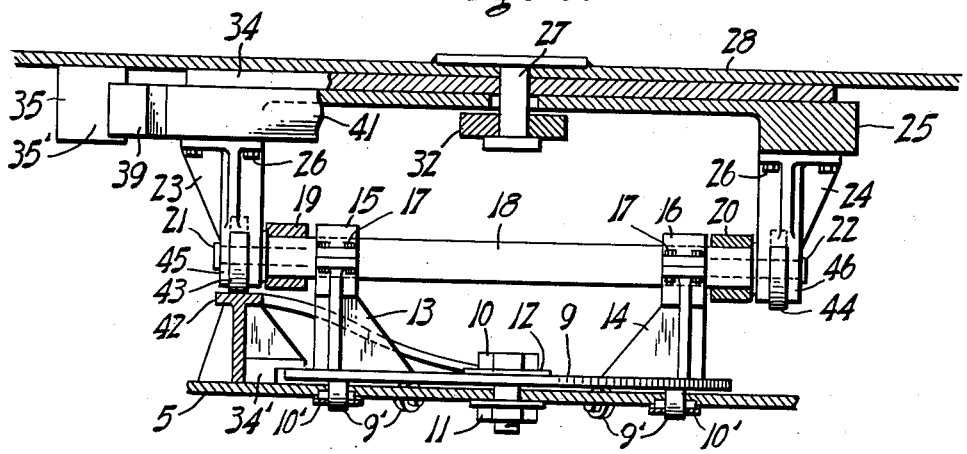
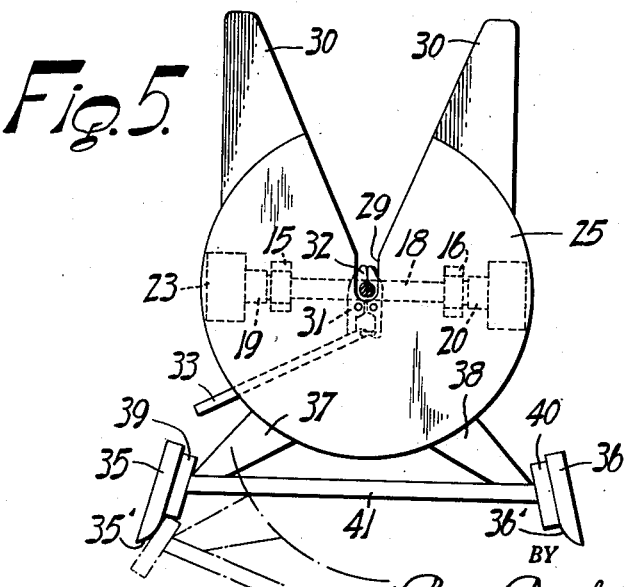

Patented Feb. 23, 1954

2,670,220

UNITED STATES PATENT OFFICE 2,670,220

TRACTOR TRAILER CONNECTION DEVICE

Jesse Colpo, Orchard Park, N. Y.

Application October 10, 1951, Serial No. 250,656

16 Claims. (Cl. 280—438)

This invention relates to a connection device in the nature of a fifth wheel structure for connecting a trailer or semi-trailer to a tractor and more particularly to a new tractor trailer connection device for supporting the forward end of a trailer on the rear end of a tractor, and which possesses marked advantages over conventional prior art constructions.

One primary disadvantage encountered in prior art tractor trailer connection means resides in the fact that maximum clearance for full turning movements of the tractor relative to the trailer must be provided at all times. In other words, the clearance between the tractor and the trailer must be sufficient at all times to accommodate the rear wheels and adjacent parts of the tractor when the tractor is turned at right angles to the trailer, even though such clearance is necessary only during a full turning movement of the tractor, considerably less clearance being required when the tractor and trailer are alined. Since the overall height of the tractor trailer unit is fixed by the clearance provided by underpasses and other structures encountered enroute, and since the overall length thereof is closely regulated by state law, the available load space is limited accordingly, and this lost space limitation represents a cost factor of considerable significance.

Accordingly, it is an object of the instant invention to provide a tractor trailer connection device which automatically elevates the forward end of the trailer and moves the same rearwardly upon turning movements of the tractor relative thereto, and in proportion to the degree of turning movement, thereby enabling the trailer to be connected to the tractor with a minimum of clearance therebetween when said tractor and trailer are alined while insuring sufficient clearance therebetween at all times.

Another object of the instant invention is to provide a tractor trailer connection means utilizing the weight of the trailer to absorb the initial shock resulting from a difference between the rate of movement of the tractor and that of the trailer, thereby preventing damage which would otherwise result from sudden starting and stopping of the tractor.

A further object of the instant invention is to provide a tractor trailer connection device providing adequate transverse support for the trailer at all times regardless of the position of the tractor relative to the trailer.

In addition, it is an object of the instant invention to provide a tractor trailer connection device having the aforesaid characteristics and which is adapted for ready connection to conventional trailer units without modification thereof.

It is also an object of the instant invention to provide a tractor trailer connection arrangement enabling the tractor to approach the trailer at a substantial angle for coupling the same together.

The foregoing and other objects will become apparent upon an understanding of the following detailed description, together with the accompanying drawings wherein:

Fig. 4 is a view in front elevation of the connection device of the instant invention when the tractor is at right angles to the trailer, with certain parts shown in section for greater clarity; and Fig. 5 is a plan view taken along line V—V of Fig. 3.

Figure 1:
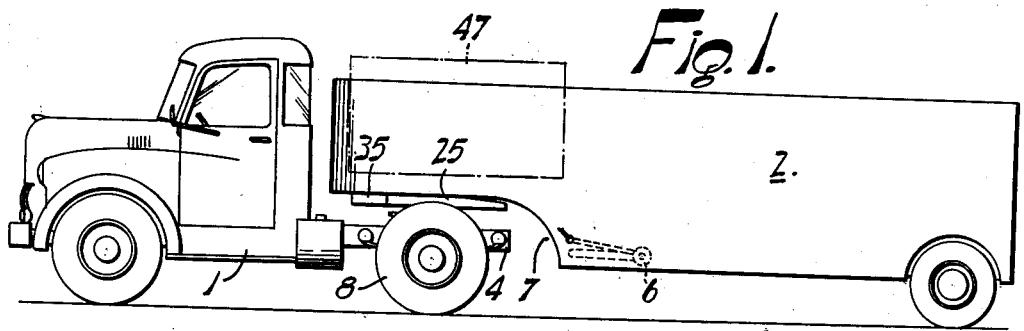
Fig. 1 is a view in side elevation of a tractor trailer combination coupled together by the connection device of the instant invention, and showing in broken lines the elevated position of the front end of the trailer when the tractor and the trailer are turned at right angles to each other.

There is shown in Fig. 1 of the drawings a tractor 1 and a trailer 2 connected thereto, tractor 1 being provided at its rearward portion with side frame members 3 and 4 and a floor 5 extending therebetween. Trailer 2 is provided with conventional folding legs 6 for supporting the same when uncoupled from the tractor, and is recessed at its lower forward portion, as at 7, which recess accommodates the rear wheels 8 and adjacent structure of tractor 1.

The connection device of the instant invention comprises an anti-tilt or stabilizer base plate 9 mounted on floor 5 for rotation about an upright axis, being secured to said floor by a bolt 10 and nut 11 with washers 12 appropriately placed to bear against plate 9 and floor 5. Also, and if desired, roller bearings 9' or the like may be provided, being carried by floor 5 to bear against plate 9 to provide a substantially frictionless rolling support therefor, said bearings being supported by bearing plates 10' secured to floor 5. Diametrically opposed upright bracket members 13 and 14 are secured on plate 9, as by welding, and contain at their upper portions bearing members 15 and 16, respectively. Bearing members 15 and 16 are arranged to comprise upper and lower portions bolted or otherwise secured together as at 17, and a crankshaft 18 is removably journaled therein. The ends of crankshaft 18 extend beyond bracket members 13 and 14, and crank arms 19 and 20 are fixedly mounted thereon to depend therefrom. At their lower ends, crank arms 19 and 20 are provided with outwardly directed shafts 21 and 22, respectively, and support arms 23 and 24 are rotatably secured at their lower ends on said shafts 21 and 22. Thus, crank arms 21 and 22 and support arms 23 and 24 combine to form a pair of articulated support members.

A standard fifth wheel element 25 is bolted or otherwise secured to the upper portion of support arms 23 and 24, as by means of bolts 26 or the like, whereby said fifth wheel element is carried on said arms. A kingpin 27 extends from the forward floor portion 28 of trailer 2 into recess 7, and fifth wheel element 25 contains a slot 29 adapted to receive kingpin 27, and inwardly tapered leg members 30 adapted to guide said kingpin into said slot. The fifth wheel element 25 is also provided with a conventional locking mechanism 31 including pivoted gripping jaws 32 receiving said kingpin and a control handle 33 for locking said kingpin in said jaws until released by actuating said handle. In addition, a reinforcing plate 34 is carried by trailer 2 and bears against fifth wheel element 25.

Therefore, fifth wheel element 25 is supported on plate 9, with brackets 13 and 14 providing spaced points of support. When it is desired to couple the tractor to the trailer, the tractor is simply backed into recess 7 in trailer 2 until kingpin 27 is firmly locked in place in slot 29. At this point, the tractor and trailer are securely locked together with the forward portion of the trailer 2 supported on the rearward portion of tractor 1. Since plate 9 is rotatably supported on floor 5, the tractor can be turned relative to the trailer for maneuvering purposes. In this regard, and to prevent tilting of plate 9 as the tractor is turned relative to the trailer, a retainer plate 34' is fixed to floor 5 and extends over the forward edge portion of plate 9. If desired, bearings may be provided between plates 34' and 9.

Another feature of the instant invention resides in the provision of spaced guide members 35 and 36 inclined inwardly toward kingpin 27 and extending downwardly from the forward portion of trailer 2 into recess 7, said guide members being provided with cam surfaces 35' and 36', respectively. Fifth wheel element 25 is provided with ears 37 and 38 extending outwardly and forwardly therefrom, and bearing plates 39 and 40 are fixed to the outer ends of ears 37 and 38 to be snugly received between guide members 35 and 36 when said tractor and trailer are coupled together. A spacing and reinforcing bar 41 extends between plates 39 and 40 to brace the same. Therefore, as illustrated by broken lines in Fig. 5, when the tractor is backed under the forward end of the trailer, said guide brackets 35 and 36 serve to cam the fifth wheel element 25 into proper alinement with kingpin 27, regardless of the angle of approach of the tractor relative to the trailer. Thus, whereas in conventional installations it is necessary that the tractor be in substantial alinement with the trailer when it is backed thereunder to secure kingpin 27 in slot 29 and lock 31, the instant invention permits the tractor to be backed under the trailer at a substantial angle relative thereto. Since quite often there is provided only a minimum of room for coupling of tractor trailer combinations such as that with which the instant invention is concerned, the provision of this coupling arrangement is important since it enables coupling of the tractor to the trailer in places where there is not sufficient room to permit alinement of the tractor and the trailer. Also, guide members 35 and 36 cooperate with plates 39 and 40 to secure said fifth wheel whereby the entire connection device thus far described remains fixed relative to trailer 2 and is mounted for rotation relative to tractor 1.

Of course, the connection device of the instant invention does not necessarily require the illustrated fifth wheel element, kingpin, and locking mechanism, but can use other means in place thereof for securing the connection device to the trailer. However, by providing the illustrated fifth wheel element, which is standard except for ears 37 and 38, plates 39 and 40, and bar 41, and the illustrated conventional locking mechanism, a tractor provided with the connecting device of the instant invention can be connected to conventional trailer units utilizing a kingpin connection. Also, the distance between guide members 35 and 36 at their closest point is greater than the diameter of the fifth wheel element, whereby in the event of a breakdown of the tractor a substitute tractor having a standard fifth wheel connection arrangement can be coupled to a trailer equipped according to the instant invention.

Figure 3:
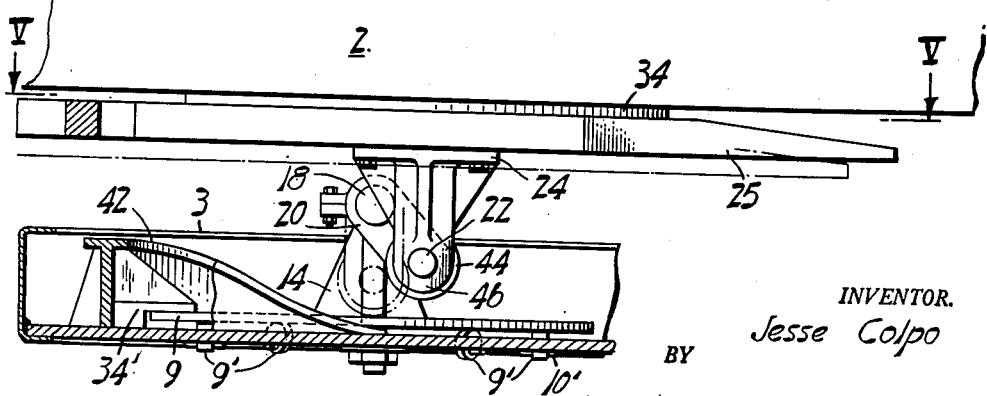
Fig. 3 is a view in side elevation of the connection device of the instant invention.

With this construction, arms 19 and 20 and support arms 23 and 24 are mounted for swinging movements about the horizontal crankshaft axis, and thus there is provided a shock absorbing action which absorbs the initial shock resulting from sudden stopping and starting of the tractor. Thus, upon sudden starting of the tractor, the inertia of the trailer will cause crank arms 19 and 20 to swing rearwardly, elevating support arms 23 and 24 and thus lifting the forward end of the trailer as clearly illustrated in Fig. 3. The weight of the trailer resists this action, whereby shocks which would otherwise result upon sudden movement of the tractor are absorbed and cushioned in the connection device of the instant invention, and this occurs on both starting and stopping of the tractor. In the latter case, crank arms 19 and 20 tend to swing forwardly or in a clockwise direction as viewed in Fig. 3, and the weight of the trailer is again utilized to absorb the sudden shock of stopping the tractor. Also, it will be noted that the resistance or restoring force introduced by the weight of the trailer increases as the trailer is caused to be elevated, by reason of the fact that the trailer weight is being applied to a progressively longer lever arm, and thus the shock absorbing action is automatically increased with an increase in the degree of shock impact.

A primary advantage provided by the connection device of the instant invention resides in the fact that means are provided whereby the forward end of the trailer 2 is automatically elevated and moved rearwardly upon turning movements of the tractor relative to the trailer in either direction, whereby only a minimum of clearance need be provided while the tractor and trailer are alined, and adequate clearance therebetween is insured.

Figure 2:
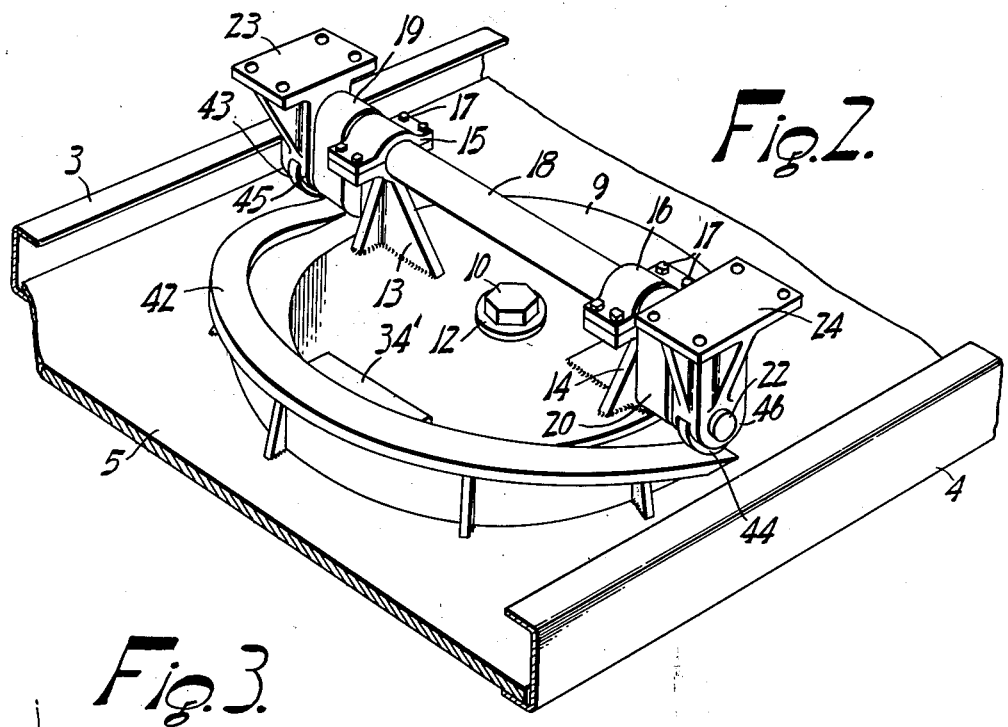
Fig. 2 is a perspective view of the connection device of the instant invention with the fifth wheel element removed.

Thus, an arcuate cam trackway 42 is carried by floor 5 of tractor 1, being secured thereon in a conventional manner, and extends at opposite ends to points adjacent the normal position of arms 23 and 24 when the tractor and trailer are alined, as clearly illustrated in Fig. 2. Also, as is apparent from an inspection of Figs. 2, 3 and 4, said trackway is provided with an upper cam surface varying in height from a minimum at each end to a maximum at its center portion. Said trackway moves with tractor 1 and is arranged to extend directly beneath arms 23 and 24 as said tractor is turned relative to said trailer, and roller means 43 and 44 are carried by shafts 21 and 22, respectively, fitting between bifurcated lower end portions 45 and 46 of arms 23 and 24, respectively, which rollers are arranged to engage and ride upon the upper cam surface of trackway 42 with a minimum of frictional resistance therebetween as said tractor is turned relative to said trailer.

Therefore, it will be observed that as tractor 1 is turned relative to trailer 2, trackway 42 will extend beneath one or the other of rollers 43 and 44, depending upon the direction of turning movement, and will engage the same to elevate the corresponding support arm, with said support arm and its associated crank arm swinging rearwardly and upwardly during this action. Since crank arms 19 and 20 are fixed to crankshaft 18, the other crank arm and support arm are also moved rearwardly and upwardly an equal amount, and therefore fifth wheel element 25, and consequently the forward end of trailer 2, are elevated and moved rearwardly relative to tractor 1 whereby to provide increased clearance between the forward end of trailer 2 and the rear end of tractor 1. Also, since that portion of trackway 42 which engages the support arm varies in height from a minimum when said tractor and trailer are alined to a maximum when they are turned at right angles to each other in either direction, the amount of clearance therebetween increases with an increase in the degree of turning movement.

Fig. 4 shows the position assumed by the connection device when the tractor has been turned at right angles to the trailer, as in making a sharp right-hand turn, and it will be observed that roller 43, and consequently arm 23, has ridden up trackway 42 to the center portion thereof, whereby said arm 23 has been elevated to its maximum height and moved rearwardly a maximum distance. Of course, crank arms 19 and 20 are fixed to crankshaft 18 so that they must move in unison, and therefore both support arms 23 and 24 have been moved rearwardly and elevated to the maximum height, carrying therewith the fifth wheel element 25 and consequently the forward end of trailer 2. The increased clearance provided between trailer 2 and tractor 1 when they are turned at right angles to each other is clearly illustrated in Fig. 1, wherein the maximum raised position of the front end 47 of trailer 2 is illustrated in broken lines.

While Fig. 4 shows the manner in which the trailer is elevated and moved rearwardly when the tractor makes a right-hand turn, it will be understood that the operation is the same when the tractor makes a left-hand turn. In the latter case, the other half of trackway 42 engages roller 44 to elevate and move rearwardly arm 24, arm 23 of course being elevated and moved rearwardly in unison therewith, whereby fifth wheel element 25 and the forward end of trailer 2 are moved rearwardly and raised to an elevated position determined by the degree of turning movement. Thus, the operation remains the same, but during turning movements in one direction one roller rides on one half of the trackway while during turning movements in the opposite direction the other roller rides upon the other half of the trackway.

The advantages provided by this construction are obvious. Recess 7 can be of minimum dimensions, and the clearance between the forward end of trailer and the rearward end of the tractor can be at an absolute minimum just sufficient to enable rear wheels 8 and the adjacent tractor structure to clear the forward end of the trailer when said tractor and trailer are in alined position. Even though the clearance thus provided when the tractor and trailer are alined is not sufficient for the rear wheels 8 and adjacent tractor structure to clear the under side of the forward end of the trailer upon turning movements of the tractor, since the instant invention provides means automatically raising the forward end of the trailer and moving the same rearwardly upon turning movements of the tractor relative thereto in either direction, and in proportion to the degree of turning, sufficient clearance between the forward end of the trailer and the rearward end of the tractor is insured at all times.

Therefore, whereas in conventional tractor trailer combinations the maximum clearance between the forward end of the trailer and the rear end of the tractor required for full turning movements therebetween must be provided at all times, with the instant invention only a minimum clearance need be provided when the tractor and trailer are alined. Since the tractor and trailer are generally substantially alined when passing under bridges and other structures establishing a set height limitation, the instant invention enables a greater utilization of trailer space for the carrying of goods, and consequently permits a larger load to be carried than would be permitted by conventional installations.

Also, since fifth wheel element 25 is fixed in position, with relative rotation occurring between plate 9 and floor 5, crankshaft 18 always extends transversely of trailer 2 regardless of the degree or direction of turning of the tractor relative thereto. The trailer is supported from each end of crankshaft 18, and this, coupled with the use of spaced support brackets 13 and 14 adjacent the outer ends of crankshaft 18, provides full and stable transverse support of trailer 2 at all times regardless of the position of tractor 1 relative thereto, thereby preventing tilting of the trailer even when the tractor is turned relative thereto. In addition, the points on trackway 42 which first engage rollers 43 and 44 are spaced forwardly of said rollers when the tractor and trailer are alined, thereby enabling crank arms 19 and 20 and support arms 23 and 24 to swing forwardly and upwardly to absorb the initial shock resulting from sudden stopping of the tractor.

Therefore, it is seen that the instant invention fully accomplishes its aforesaid objects, and provides a connection device for coupling a trailer to a tractor with an absolute minimum of clearance therebetween when alined, while at the same time automatically elevating the forward end of the trailer and moving the same rearwardly as the tractor is turned relative thereto and thereby insuring sufficient clearance therebetween at all times. Further, the connection device of the instant invention provides an effective shock absorbing arrangement, the tractor unit can be coupled to standard trailer units and the trailer unit can be connected to tractors having conventional fifth wheel arrangements, and the connection device of the instant invention enables the tractor to approach the trailer at a considerable angle during coupling movements and provides adequate transverse support for the trailer at all times.

While a preferred embodiment of the instant invention has been described and illustrated, various changes in and modifications of the specific details thereof can be made without departing from the inventive concept, and it is intended that the invention be limited solely by the scope of the appended claims.

Having completely disclosed the instant invention in a preferred embodiment thereof, and having described its mode of operation, what is claimed as new is as follows:

1. A connection device for coupling a trailer to a tractor comprising, first support means mounted on said tractor for movement about a substantially upright axis, second support means adapted to be secured to said trailer, means connecting said second support means to said first support means for movement relative thereto in an upward and rearward direction, and elevator means carried by said tractor for engaging and so moving said second support means upon relative turning movements between said tractor and said trailer.

2. A connection device for coupling a trailer to a tractor comprising, first support means carried by said tractor, said first support means being mounted for movement about a substantially upright axis, second support means adapted for attachment to said trailer, said second support means being carried by said first support means for vertical movement relative thereto, and cam means carried by said tractor and engaging said second support means to elevate the same as said tractor is turned relative to said trailer.

3. A connection device for connecting a trailer to a tractor comprising, first support means including spaced support brackets mounted on said tractor for movement relative thereto about a substantially vertical axis, shaft means journaled in said support brackets, second support means adapted for attachment to said trailer, spaced articulated arms connecting said second support means to said shaft means, and means carried by said tractor for engaging one of said arms and camming the same upwardly and rearwardly upon turning movements of said tractor relative to said trailer.

4. A connection device for coupling a trailer to a tractor comprising, a base structure mounted on said tractor for movement relative thereto about a substantially upright axis, spaced support brackets carried by said base structure, shaft means journaled in said support brackets to extend substantially transversely of said trailer, connection means adapted for attachment to the forward end of said trailer, spaced articulated arms mounting said connection means on said shaft means, and cam trackway means of varying height carried by said tractor and engaging at least one of said articulated arms as said tractor is turned relative to said trailer whereby to raise the forward end of said trailer during turning movements of said tractor relative thereto.

5. A connection device for coupling a trailer to a tractor comprising, a base structure mounted on said tractor for movement about a substantially upright axis, diametrically opposed support brackets carried by said base structure, shaft means journaled in said support brackets to extend substantially transversely of said trailer, trailer attaching means including jointed leg means mounted on said shaft means, and elevator means carried by said tractor for engaging said trailer attaching means and simultaneously elevating and moving the same rearwardly as said tractor is turned relative to said trailer.

6. A tractor trailer connection means comprising, first support means mounted on the tractor for movement relative thereto about a substantially upright axis, said first support means including spaced support arms, shaft means journaled in said support arms to extend substantially transversely of the trailer, second support means adapted to be connected to the trailer, said second support means including spaced articulated leg means mounted on said shaft means, and cam means carried by the tractor for engaging and elevating at least one of said leg means as the tractor is turned relative to the trailer.

7. A connection means as defined in claim 6 wherein said leg means are provided with cam-engaging roller means at their lower ends.

8. A connection means as defined in claim 6 wherein said cam means comprises a curved trackway extending between said support arms when the tractor and trailer are alined and varying in height from a minimum at its end portions to a maximum at its central portion.

9. A connection means as defined in claim 8 wherein the leg means raising portions of said trackway are spaced forwardly of said leg means when the tractor and the trailer are in straightaway alinement.

10. A tractor trailer connection device comprising, a base plate mounted on said tractor for movement relative thereto about a substantially vertical axis, spaced support brackets carried by said base plate, shaft means carried by said support brackets to extend transversely of said trailer, support means adapted for attachment to said trailer and including spaced downwardly extending jointed leg portions mounted on said shaft means, restraining means carried by said tractor and bearing against said base plate to prevent tilting of the latter, and cam means carried by said tractor and engaging at least one of said leg portions to move the same upwardly and rearwardly as said tractor is turned relative to said trailer whereby to elevate and move rearwardly said support means.

11. A tractor trailer connection device comprising, a base plate mounted on said tractor for movement relative thereto about a substantially upright axis, bearing means carried by said tractor and providing a support for said plate, spaced support arms carried by said base plate, shaft means journaled in said support arms and extending substantially transversely of said trailer, support means adapted to be fixedly secured to said trailer, said support means including spaced leg portions mounted on said shaft means for up and down movement relative thereto, and cam means carried by said tractor and bearing upwardly against at least one of said leg portions to raise said support means as said tractor is turned relative to said trailer.

12. In combination with a tractor and a trailer, a connection device comprising first support means mounted on said tractor for movement relative thereto about a substantially upright axis, said first support means including spaced bracket members, shaft means journaled in said bracket members to extend substantially transversely of said trailer, second support means comprising a plate member adapted for attachment to said trailer, said second support means including spaced leg means eccentrically mounted on said shaft means, connecting pin means extending downwardly from the forward end of said trailer, said plate member being provided with a slot adapted to receive said connecting pin means, means for locking said connecting pin means in place in said slot, transversely spaced guide means extending downwardly from said trailer at positions spaced forwardly of said connecting pin means, said guide means being spaced apart a distance greater than the maximum width of said plate member, and bearing members extending outwardly from said plate member into engagement with said guide means, whereby said guide means will secure said plate member against rotation and will aline said slot and connecting pin means when said trailer is being coupled to said tractor.

13. In the construction defined in claim 12, cam means carried by said tractor for engaging at least one of said leg means to simultaneously elevate said plate member and move the same rearwardly as said tractor is turned relative to said trailer.

14. In combination, a tractor unit, a trailer unit, connecting means coupling together said units, said connecting means comprising a first section connected to one of said units for movement relative thereto about a substantially vertical axis and a second section fixed to the other of said units, whereby said units may be turned relative to each other, means connecting one of said sections to the other of said sections for movement relative thereto in an upward and rearward direction, and elevator means carried by one of said units for engaging and so moving said one section as said units are turned relative to each other.

15. In combination with a vehicle and a trailing vehicle, a connection device therefor comprising base plate means mounted on said vehicle for movement relative thereto about a substantially vertical axis, shaft support means carried by said base plate means, shaft means journaled in said shaft support means, mounting plate means adapted for attachment to said trailing vehicle, jointed arm means connecting said mounting plate means to said shaft means at spaced points thereon for swingingly supporting the former from the latter, means defining a slot in said mounting plate means, connecting pin means extending downwardly from the forward end of said trailing vehicle, lock means on said mounting plate means for releasably securing said connecting pin means in said slot, and locking means interconnecting said mounting plate means and said trailing vehicle for securing said mounting plate means against rotation relative to said trailing vehicle.

16. A connection device for coupling a trailer unit to a tractor unit comprising, a first section connected to one of said units for movement relative thereto about a substantially upright axis and a second section fixed to the other of said units, whereby said units may be turned relative to each other, means connecting one of said sections to the other thereof for vertical movement relative thereto, and cam means carried by one of said units for automatically engaging and so moving said one section upon relative turning movements between said units.

JESSE COLPO.

References Cited in the file of this patent

UNITED STATES PATENTS

| Number | Name | Date |
|---|---|---|
| 2,100,463 | Wohlfarth | Nov. 30, 1937 |
| 2,515,575 | Van Langen | July 18, 1950 |
| 2,567,312 | Apgar | Sept. 11, 1951 |